(12) United States Patent
Jones

(10) Patent No.: US 6,771,002 B2
(45) Date of Patent: Aug. 3, 2004

(54) HIGH VOLTAGE ELECTROSTATIC GENERATOR

(76) Inventor: Edward B. Jones, 1002 Jones Rd., Pelham, NC (US) 27311

(*) Notice: Subject to any disclaimer, the term of this patent is extended or adjusted under 35 U.S.C. 154(b) by 0 days.

(21) Appl. No.: 09/815,294

(22) Filed: Mar. 22, 2001

(65) Prior Publication Data
US 2002/0047492 A1 Apr. 25, 2002

Related U.S. Application Data
(60) Provisional application No. 60/191,064, filed on Mar. 21, 2000.

(51) Int. Cl.$^7$ ................................................ H02N 1/00
(52) U.S. Cl. ...................................................... 310/309
(58) Field of Search ................................. 310/308–310

(56) References Cited

U.S. PATENT DOCUMENTS

| | | | |
|---|---|---|---|
| 398,122 A | * 2/1889 | Birdsall | 310/309 |
| 575,231 A | * 1/1897 | Gwane | 310/309 |
| 687,455 A | * 11/1901 | Frandsen et al. | 310/30 |
| 4,789,802 A | 12/1988 | Miyake | 310/308 |

FOREIGN PATENT DOCUMENTS

GB  22731  * 11/1901  ............ H02N/1/00

OTHER PUBLICATIONS

O'Hanian, "Physics", Dec. 1985, p. 541.*
Ford, "Homemade Lightning", Third Edition, McGraw–Hill, Jan. 2002.*

* cited by examiner

Primary Examiner—Karl I Tamai
(74) Attorney, Agent, or Firm—Law Offices of Royal W. Craig

(57) ABSTRACT

An improved electrostatic generator comprising a pair of contra-rotating disks, each bearing a plurality of conducting sectors, similar to the prior art Wimshurst generator. A plurality of grounding conductors with brushes at each end are associated with each of two counter-rotating disks, each grounding conductor alternately grounding a pair of opposing charge plates on each disk as it rotates. The generator also includes a pair of output terminals each having a brush at one end for electrical connection to the charge plates on one of the disks. Upon counter-rotation of the pair of disks, the grounding conductors induce each charge plate to accumulate a logarithmically-increasing charge until they are discharged to the next output terminal. The accumulating charge makes the device far more efficient than a conventional Wimshurst generator.

1 Claim, 8 Drawing Sheets

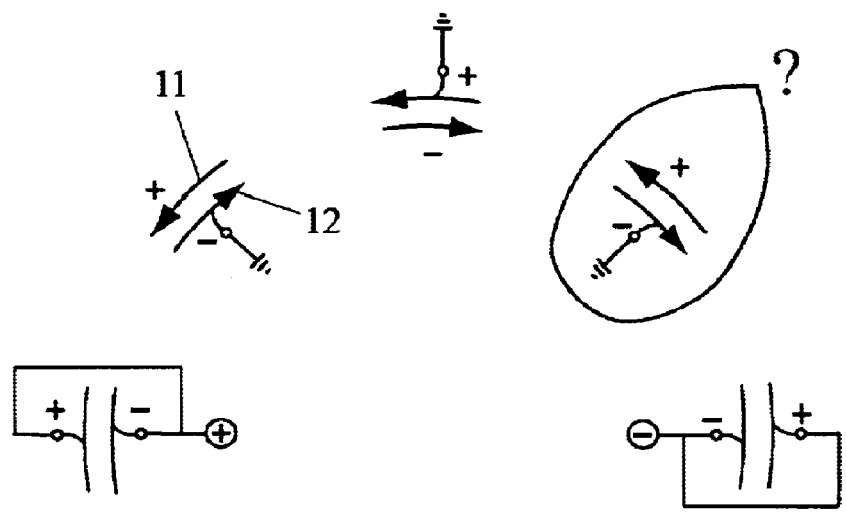
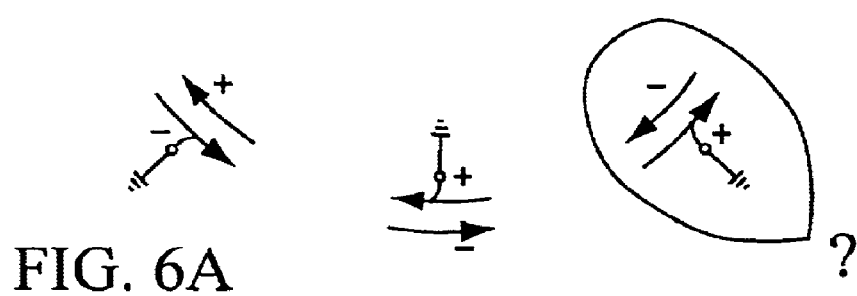
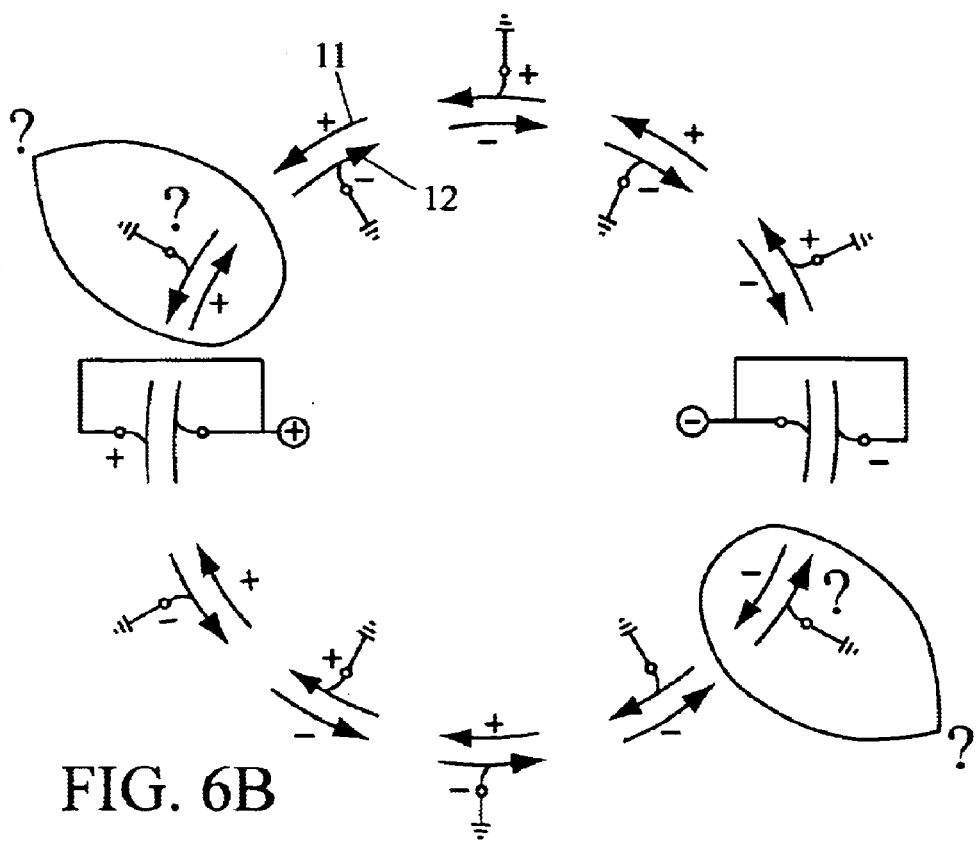
FIG. 6A
FIG. 6B

HIGH VOLTAGE ELECTROSTATIC GENERATOR

CROSS-REFERENCE TO RELATED APPLICATION(S)

The present application derives priority from U.S. Provisional Application No. 60/191,064 filed Mar. 21, 2000.

BACKGROUND OF THE INVENTION

1. Field of the Invention

The present invention relates to electrostatic generators and, more particularly, to an improved high-voltage electrostatic generator having a plurality of electrostatic energy collection means around the circumference of the contra-rotating apparatus.

2. Description of the Background

Electrostatic generators are well known and have been commercially available for over a century. Their purpose is to convert mechanical energy, such as that delivered through a rotating shaft by an electric motor or a manual crank, into high-voltage, low-current electrical energy. Electrostatic energy is an important constituent of many modern technologies, including high-energy physics and electronic medical diagnostics.

An early electrostatic generator was invented by J. Wimshurst in England in 1883. The Wimshurst generator consists of two contra-rotating disks mechanically connected around the same shaft and mechanically driven by belts and pulleys. Each of the disks contains an equal number of evenly spaced regions called sectors around its periphery, on which a conducting foil is applied. The contra-rotating disks with conducting foil sectors are closely spaced to induce an electrostatic charge between them.

Referring now to FIG. 1, a prior art Wimshurst generator is shown with the contra-rotating disks 10, 20 presented as concentric and a plurality of foil sectors 12, 22 spaced evenly there about. It is to be understood that in this prior art embodiment the disks are of equal diameter with an equal number of evenly spaced conductive foil sectors 12, 22. Two neutralizing bars 31, 34 with end contact brushes 32, 33 and 35, 36, respectively, ground and neutralize charged foil sectors 12, 22 as they come into contact. In operation, when mechanical rotational energy is applied to the shaft from a hand crank, an electric motor, a flywheel, or any other source, two identical functions take place on each contra-rotating disk 10, 20, one producing a positive electrostatic charge and one producing a negative electrostatic charge. A region of positively charged foil actors on one disk is brought near a region of neutral foil sectors on the other disk. The positive foil sectors induce a negative charge in the nearby neutral foil sectors on the other disk. The positive charged foil sectors pass under the next adjacent contact brush, e.g, brush 35 of the arm of neutralizing bar 34 which discharges the positive surface electrostatic charge. The formerly neutral foil sectors 12 are now negatively charged, and as they move in the opposite direction from the positively charged foil sectors on the other disk and approach neutral foil sectors. Now these negatively charged foil sectors 12 act as the charged surface to induce a positive electrostatic charge in the neutral foil sectors 22 on the first disk 20 when they touch a contact brush of the second neutralizing bar 34. As the disks turn, the neutralizing bars 34, 31 become energy producing systems, one always producing a positive electrostatic charge and one producing a negative electrostatic charge. Given the above-described configuration, the rotating foil sectors on both disks 10, 20 will reach a point where they both carry a positive electrostatic charge in one segment. Likewise, the opposing foil sectors on both disks will both carry a negative electrostatic charge in an opposite segment. Collectors 41, 44 with end contact brushes 42, 43, 45, 46 are located in these two segments collect the respective charges. The result is a high-voltage electrostatic differential. The charges derived from collectors 41, 44 can be stored in capacitors for discharge of high energy, and in traditional systems the Leyden jar is used as a capacitor that is well known to those of ordinary skill in the relevant art.

In this manner, mechanical energy is converted to electrostatic energy. In prior applications of the Wimshurst generator, the amount of energy is increased by increasing the size of the disks. The efficiency of the system is also limited by the number of energy producing systems, there being only two in the above-described example. In other words, the induced charges have to remain on the charged sectors for a significant angular extent before they reach the next collector 41, 44. This leads to inefficiency because ionization losses occur during rotation. It would be greatly advantageous to provide a more efficient electrostatic generator with increased efficiency and energy capacity. In so doing, while the amount of mechanical energy required to operate the generator would increase, the physical apparatus could be more compact and robust. A more compact generator and robust unit could find uses where previously electrostatic generators of this type were too large.

There have been a few prior efforts to improve the efficiency of the basic Wimshurst generator. These include improvements such as disks rotating on a single shaft in the same direction, multiple stages of disks, and electrical contacts using conducting pulleys and embedded pellets. An example of all of these developments is described in U.S. Pat. No. 4,789,802 to Miyake. However, when produced with multiple stages, the Miyake generator is much larger and more complicated and more expensive than a Wimshurst generator of the same diameter. The Wimshurst generator, as well as another electrostatic generator known as the Van de Graf generator, are most commonly used to demonstrate electrical and physical phenomena to students. The Van de Graf generator is more commonly used because for a given size it generates greater electrostatic voltage. However, the Wimshurst machine is more easily constructed by students and educators and its components are visible, allowing a more thorough exploration of its function. The scientific and educational benefit of the device is only hampered by its complexity. It would be greatly advantageous to inventors, scientists, educators, students, and hobbyists to provide a more efficient Wimshurst-type electrostatic generator that Is smaller and no more complicated or expensive than the traditional Wimshurst generator.

SUMMARY OF THE INVENTION

It is, therefore, an object of the present invention to provide an electrostatic generator that increases the amount of electrostatic charge and electrostatic voltage differential that can be acquired in a compact apparatus.

It is another object to provide an inexpensive and facile electrostatic generator that can be constructed and operated by inventors to explore applications of electrostatic energy.

It is a further object to provide an electrostatic generator that readily demonstrates principles of electrostatic energy to students.

In accordance with the above objects, an improved high-voltage electrostatic generator is disclosed. The generator includes a pair of counter-rotating disks. Each disk has a plurality of charge plates angularly disposed about the periphery on one side, the charge plates on one disk facing those on the other. A plurality of grounding conductors with brushes at each end are associated with each of the disks, each grounding conductor alternately grounding a pair of opposing charge plates on each disk as it rotates. The generator also includes a pair of output terminals each having a brush at one end for electrical connection to the charge plates on one of the disks. Upon counter-rotation of the pair of disks, the grounding conductors neutralize each charge plate to accumulate a logarithmically-increasing charge until they are discharged to the next output terminal.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIGS. 6A and 6B are examples of unacceptable variations on the generator of FIG. 2 in which the number of charge plates 11, 12 on each disk produce conflicting polarities. Conflicting polarities means that pairs of opposing charge plates 11, 12 have the same polarity.

DETAILED DESCRIPTION OF THE PREFERRED EMBODIMENTS

Figure 2:
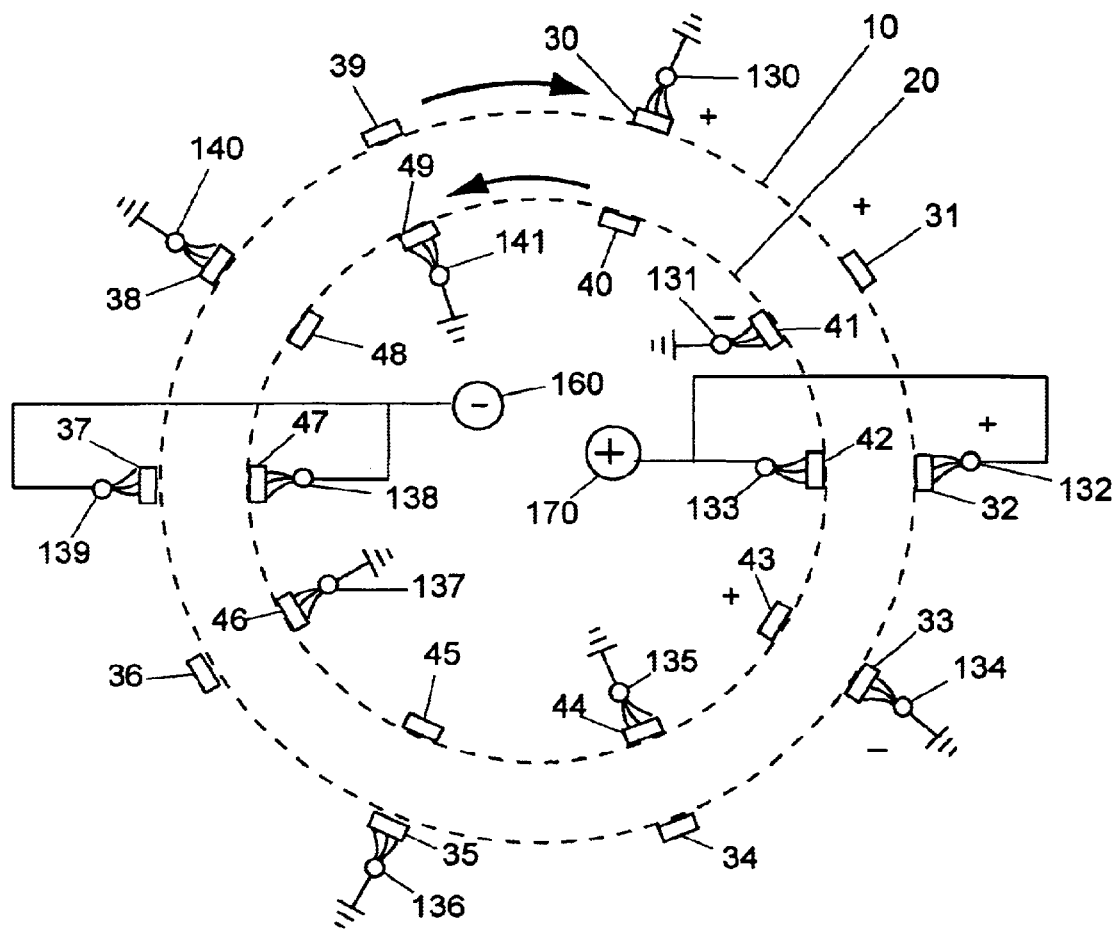
FIG. 2 illustrates one preferred embodiment of an improved electrostatic generator according to my invention.

Referring now to FIG. 2, a preferred embodiment of an improved electrostatic generator is shown according to my invention. Ten charge plates 50–59 are uniformly spaced around a first rotating disk, 10 and ten charge plates 60–69 are uniformly spaced around a second counter rotating disk 20. The charge plates are conveniently represented by a series of condensers arranged in two circles. As the two disks 10, 20 counter-rotate, a pair of opposing charge plates 57, 67 on disks 10, 20 will contact output connector 160 at the same time that an opposing pair of charge plates 57, 67, will contact output connector 170. The contact with the foregoing and all other charge plates 50–69 is accomplished via twelve identical contact brushes 130–141. Four grounded neutralizing brushes 131, 135, 137 and 141 are in operative contact with the respective charge plates 61, 64, 66, 69 on disk 20. Similarly, four grounded neutralizing brushes 130, 134, 136 and 140 are in operative contact with the respective charge plates 50, 53, 55 and 58 on disk 10. With this configuration, all charge plates on each disk that are not in contact with output connectors 160, 170 are alternately either grounded or left open. Thus, as charge plates 57, 67 on disks 10 and 20 are contacting output connector 160 and charge plates 57, 67 on disks 10, 20 are contacting output connector 170, charge plates 50, 53, 55 and 58 around disk 10 are grounded by respective brushes 130, 134, 136 and 140. Likewise, charge plates 61, 64, 66 and 69 around disk 20 are grounded by respective brushes 131, 135, 137 and 141.

Figure 1:
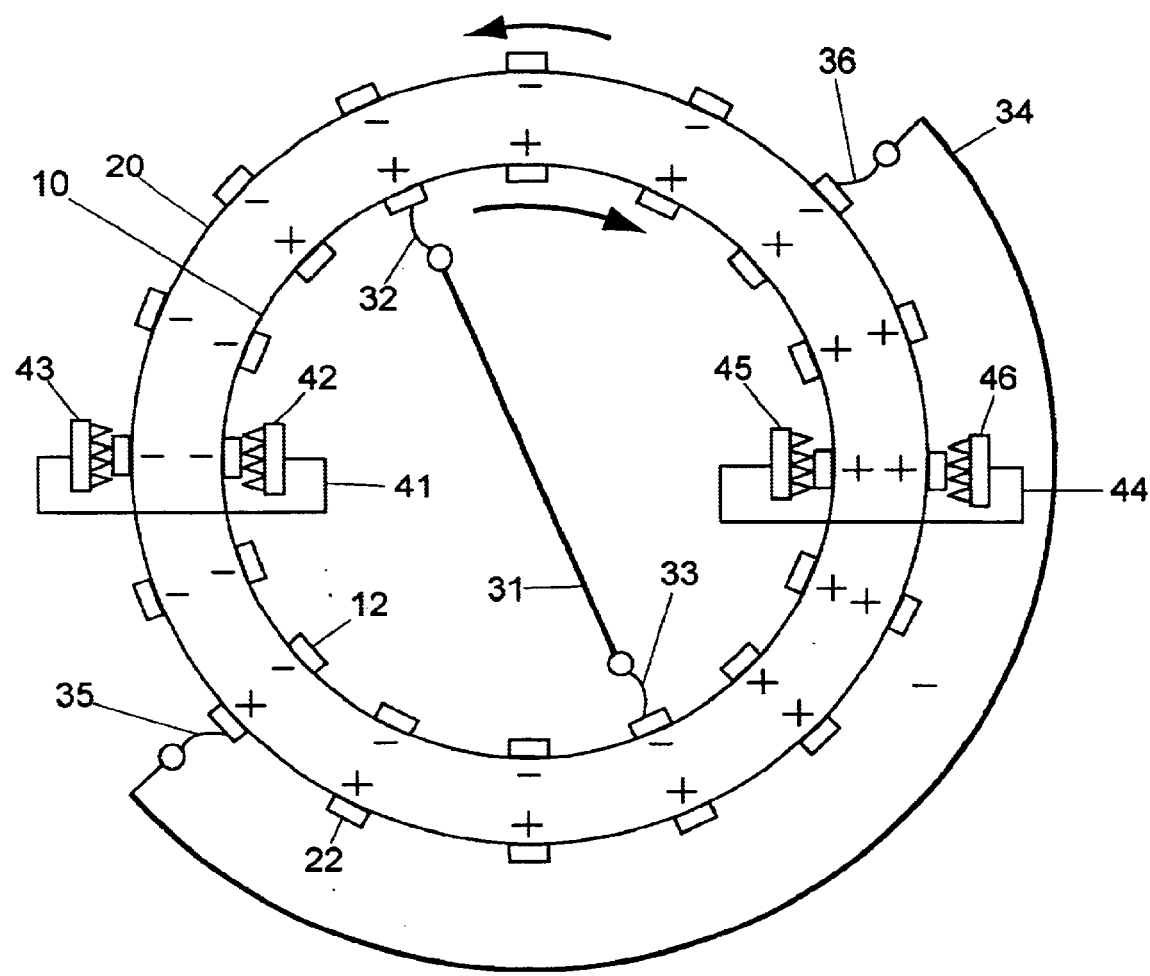
FIG. 1 is a schematic diagram of a conventional electrostatic generator of the Wimshurst type to explain the principle and operation thereof.

In contrast to dual-energy producing system as shown in FIG. 1 (prior art), the present invention employs multiple energy producing systems. With reference to the top center area of FIG. 2, as the disks 10, 20 counter-rotate, opposite charge plates 50, 60 pass and a net charge on one will induce an opposite charge in the other, resulting in a net gain in electrical energy (a conversion of mechanical to electrical energy). Ungrounded charge plates 51, 63, 65, 56, 68, 59 and 60 determine the polarity of each sector. Thus, for example, as the charge plate 60 subsequently encounters brush 131, this permits contact allowing electrons to be transferred to ground to balance the charges and maintain the increased energy of the new position. This subcycle repeats as the disks 10, 20 rotate. With each new position there is a net gain of energy, e.g., an increase in the number of electrons within each charge plate 50, 60. Thus, brushes 130, 131, 134, 135, 136, 137, 140 and 141 increase the charge on the contacting plates before the plates reach the collector output connectors 160, 170. The charging cycle continues until the charge plates 50, 60 make contact with the next terminal output connectors 170. Terminal connectors 160, 170 receive the same charge polarities from both disks 10, 20 as they turn in opposite directions. Both disks 10 and 20 must turn in order to renew charges on all charge plates 50–69. For example, if one disk 10 or 20 ceased to turn, charge plates 50, 60 would soon lose their charge and there would be nothing to produce a charge on either disk 10 or 20.

It follows that the greater the number of charge plates and brushes, the higher the induced voltage on the collector output connectors 160, 170. Since ungrounded charge plates 51, 63, 54, 65, 56, 68, 59 and 60 determine the polarity of each sector, it also follows that an even number of sectors leaves one positive output connector 170 and one negative 160.

It should be apparent from the foregoing that the number of charge plates may vary. However, one important constraint is that the number of charge plates on each disk 10, 20 must be twice an odd number. Otherwise, opposing charge plates may have the same polarity, and this tends to kill any increase in voltage. Thus, any multiple of an odd number such as 6, 10, 14, 18 . . . will avoid this problem. In other words (and in terms of sectors), the number of sectors should not equal the double of any even number, whereas the double of any odd number will avoid such problems.

Figure 3A:
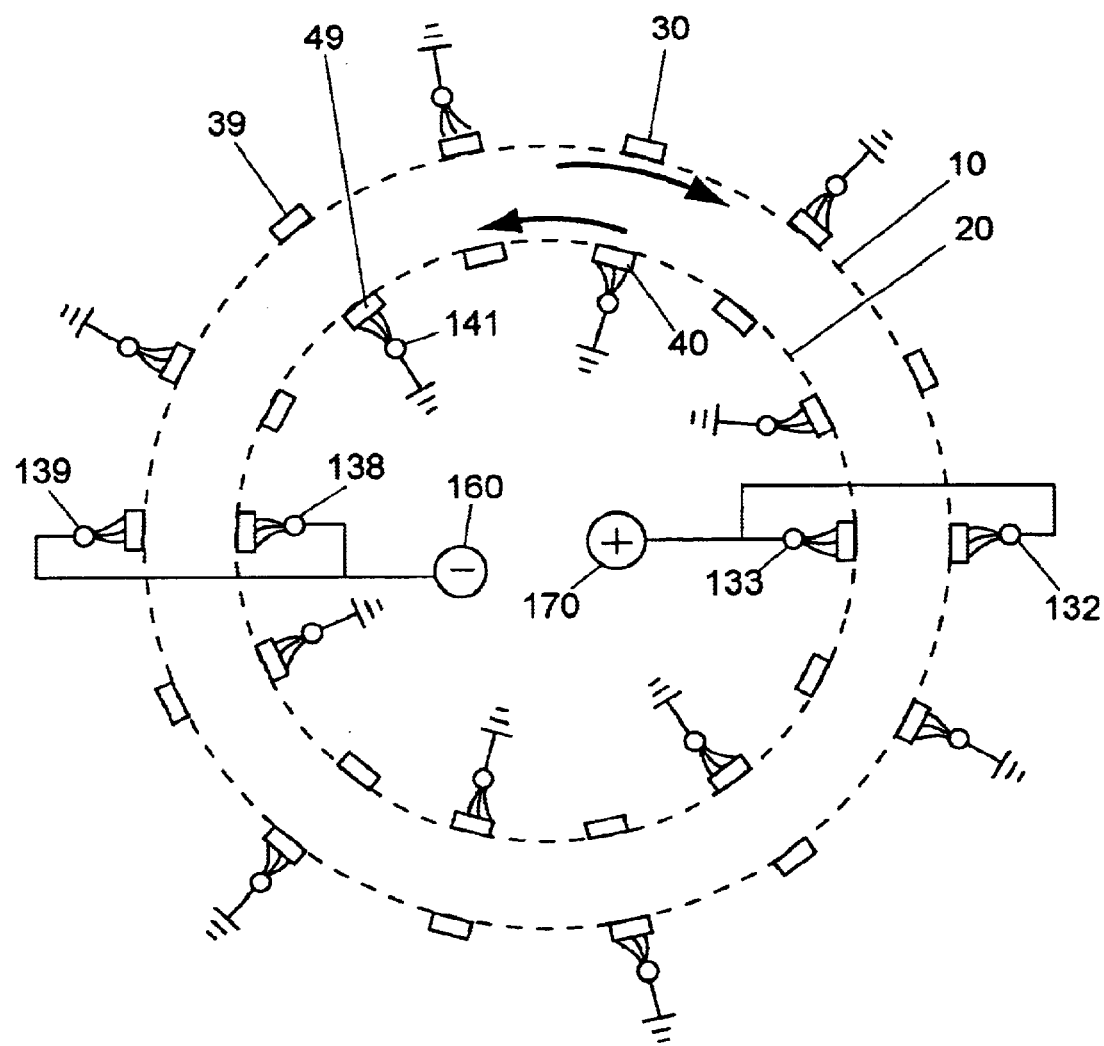
FIGS. 3A and 3B is a schematic representation of the above-described electrostatic generator 3A shown side-by-side with a conventional Wimshurst generator 3B for illustration.
Figure 3B:
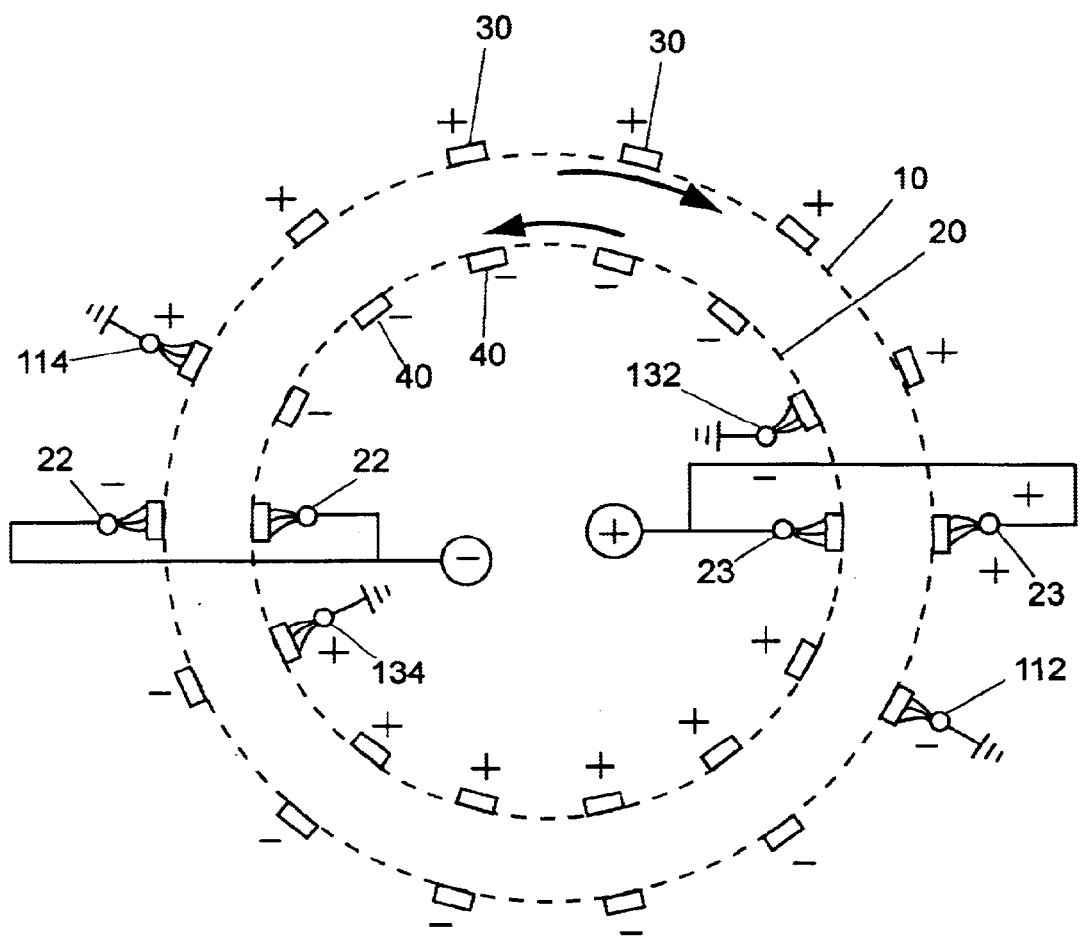

FIG. 3A is a schematic representation of a fourteen-sector electrostatic generator as described above, with a conventional Wimshurst generator shown in FIG. 3B for comparison. If the disks, 10, 20 are turned mechanical energy is transferred to the system. With reference to FIG. 3A, the mechanical energy is converted to electrical energy as electrons flow toward the grounded charge plates 60, 69 etc. in an attempt to maintain angular position. This is true despite the fact that alternate charge plates 60, 69, etc. have a common ground. As the non-grounded charge plates 50, 59 etc. move away from the illustrated position they carry the extra electrons with them, so they gain electrical energy by virtue of being separated from the oppositely charged plate. In this manner, every single charge plate becomes progressively charged and eventually releases its charge to the output terminals 160, 170. The increase of charge on each charge plate 50, 60 is a multiple of its previous charge. Hence, the cumulative increase in charge follows a logarithmic pattern rather than linear. Contrasting the conventional Wimshurst generator of FIG. 3B, there is only one pair of grounded brushes 112, 114 and 132, 134 per disk 10, 20, respectively. With fewer charging plates 50, 60 to transfer energy, each charge plate 50, 60 simply gains an incremental charge and then discharges it during each cycle. There is no logarithmic building of charge, and clearly the conventional Wimshurst generator is less efficient because it does not use all of its energy conversion ability. The key difference is the use of multiple grounding conductors (and associated brushes) per disk with the realization that these conductors may be commonly grounded and still they will allow the charging plates to accumulate charge according to a logarithmic pattern.

Figure 4:
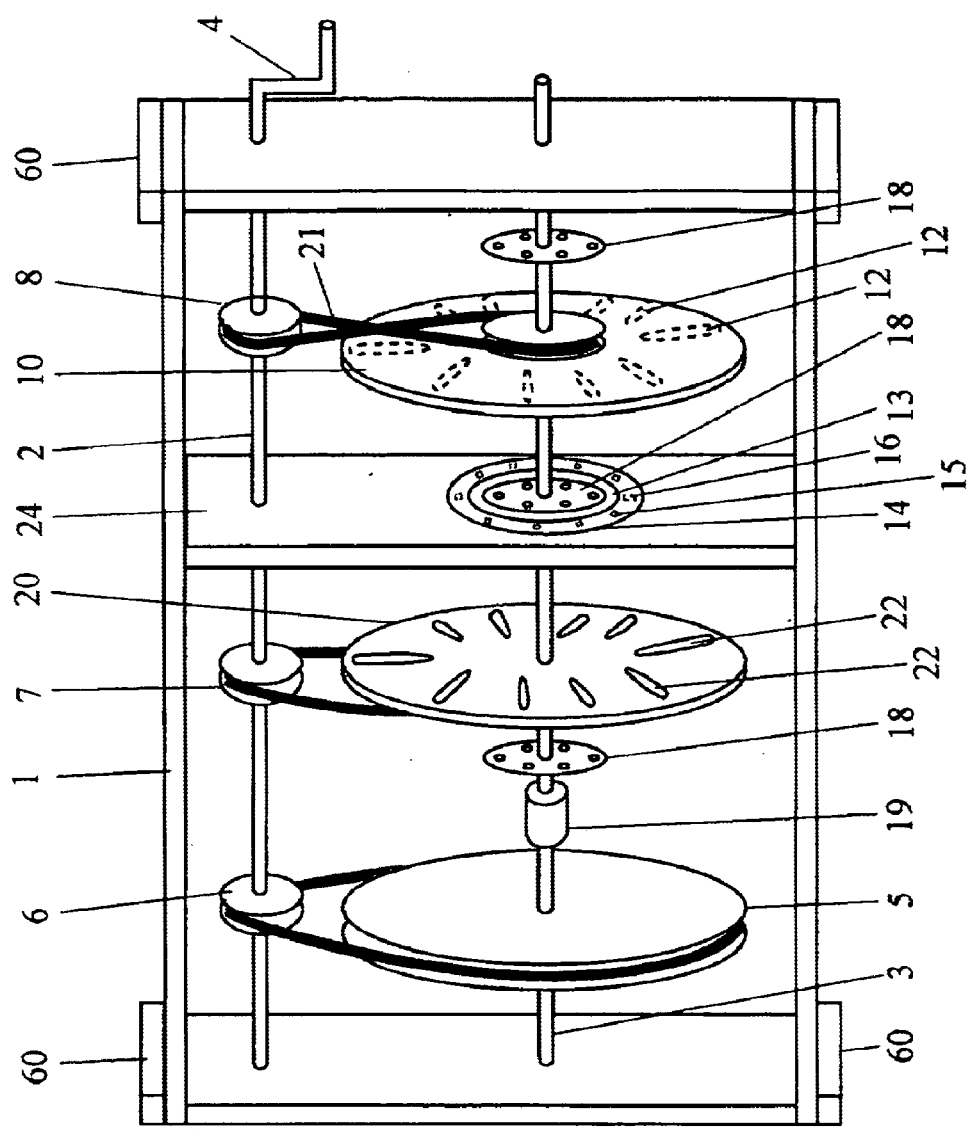
FIG. 4 is a horizontally exploded side perspective view illustrating a completed mechanical assembly for implementing the above described generator of FIG. 2.

FIG. 4 is a horizontally exploded side perspective view illustrating a completed mechanical assembly for implementing the above described generator of FIG. 2. Horizontal dimensions are enlarged and elements that are adjacent are shown as separate for illustrative purposes. The assembly includes a box frame container 1. The box frame container 1 supports two rotatable shafts 2, 3. A hand crank 4 turns shaft 2, and a large drive wheel 5 turns shaft 3. Drive pulleys 6, 7 and 8 are mounted on shaft 2. The two disks 10, 20 containing respective charge plates 12 (not shown) and 22 are mounted on shaft 3. Charge plates 12, 22 are evenly disposed around both disk's 10 and 20, and face each other. A central partition 24 passes between disks 10 and 20. This partition 24 is formed with a hole 13. A conductive metallic ring 14 encircles the inner edge of the hole 13. A conventional bearing collars 18 is mounted on shaft 3 inside ring 14 of hole 13. Additional bearing collars 18 are also fixed to shaft 3 and are used as desired to hold disks 10, 20 in place and to roll against the surfaces of disks 10, 20, when crank 4 turns. Preferably, three bearing collars 18 are used, one in between the two disks 10, 20 (positioned within the hole 13 of partition 24) and the others on the opposite sides of the disks 10, 20 and adjacent thereto. The middle bearing collar 18 should be thick enough to provide space for disks 10, 20 to clear brushes 15, 16 (See below discussion of brushes 15 and 16 mounted on ring 14 and illustrated in FIG. 5). Conventional spacers such as spacer 19 may be used to achieve the proper clearances between disks. Spacer 19 abuts drive wheel 5 and the bearing collar 18 positioned adjacent the outside surface of disk 20. Legs 60 support frame 1. Note that belt 21 is crossed in order to counter-rotate disks 10, 20 upon operation of hand crank 4.

Figure 5:
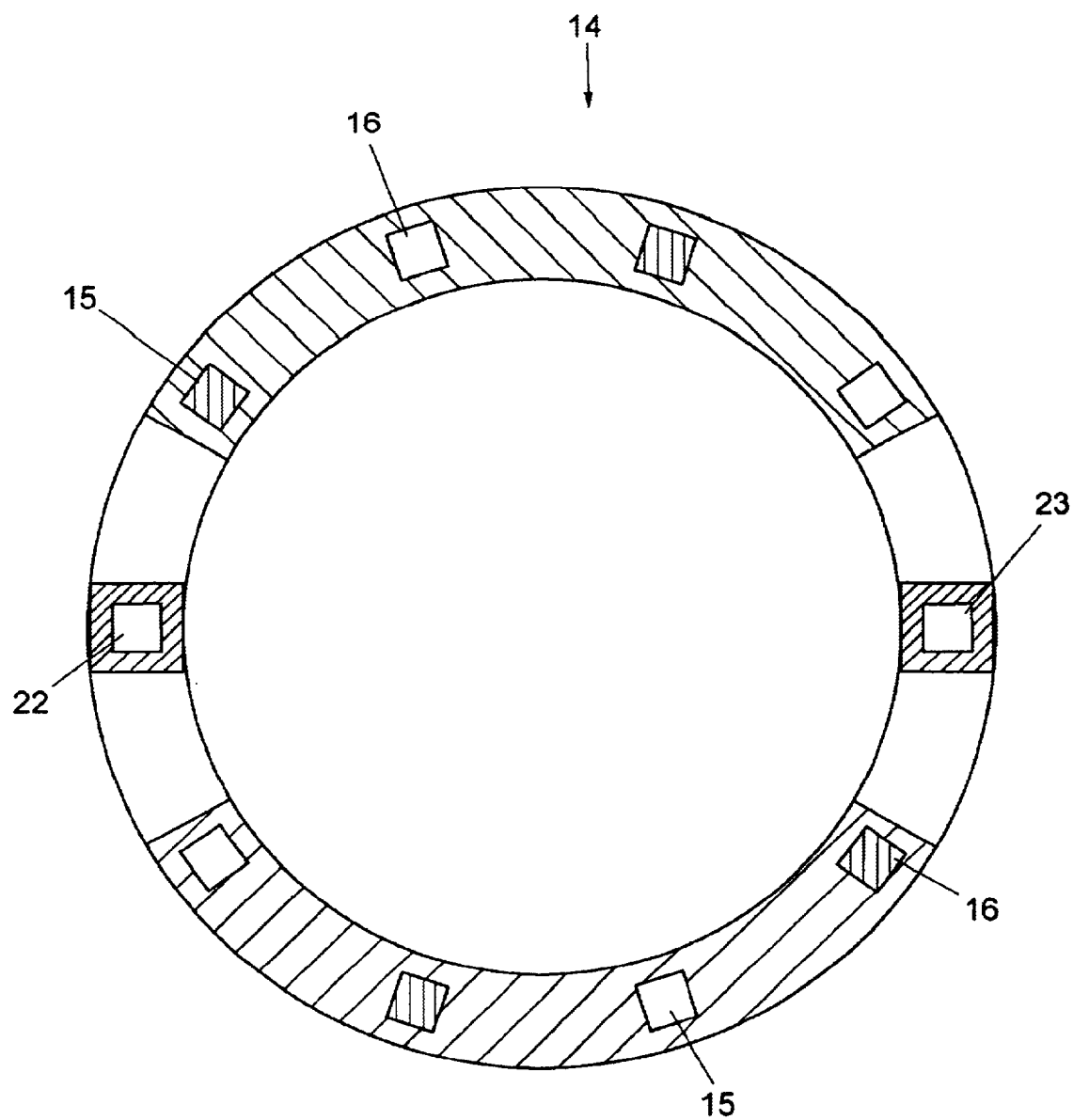
FIG. 5 is a front detailed illustration of the metallic ring 14 of FIG. 4.

FIG. 5 is a front detailed illustration of the metallic ring 14 of FIG. 4, which is segmented as shown in order to isolate two output terminals 22 and 23 from a plurality of conductive brushes 15, 16. Brushes 15 are situate on one side of the ring 14, and brushes 16 are on the opposite side of the ring 14. The brushes 15, 16 may have a common ground, but this is not necessary inasmuch as only the charge plates 11 (see FIG. 4) carry the induced charge. The insulated output terminals 22 and 23 have brushes on both sides of the ring 14 in order to pick up charges from all charge plates 11, 12 on disks 10 and 20, respectively (see FIG. 4). Conductive ring 14 may be formed aluminum foil or otherwise painted with metallic paint (metallic paint is a poor conductor for low voltage, but adequately conducts a high-voltage current). The brushes 15, 16 may be attached cylinders of rolled paper covered with an electrically conductive coating of metallic paint or aluminum foil. The two disks 10, 20 (FIG. 4) make contact with the brushes 15, 16 so that the charge plates 11, 12 on respective disks 10, 20 can pick up the charge. Alternate charge plates 12 on disk 10 (FIG. 4) are grounded by the brushes 15, and alternate charge plates 11 are isolated. The isolated charge plates 11 carry a charge which induces electron flow into the brush connected plates 12 on the opposite disk 10 as described above.

The mechanical configuration of FIGS. 4 and 5 is one simple and efficient way to achieve the progressive charge accumulation described above with reference to FIG. 2.

In both mechanical configurations, it is critical to have an acceptable number of charge plates 11, 12. The wrong number will cause conflicting polarities which will defeat voltage output.

FIGS. 6A and B illustrates two embodiments with an unacceptable number. In FIG. 6A there are 8 sets of charge plates 11, 12 on each disk, thereby yielding 8 voltage producing sectors. This would result in two sectors (circled) having opposing polarities. Similarly, in FIG. 6B there are 12 sets of charge plates 11, 12 on each disk, thereby yielding 12 voltage producing sectors two of which (circled) having opposing polarities.

Figure 7A:
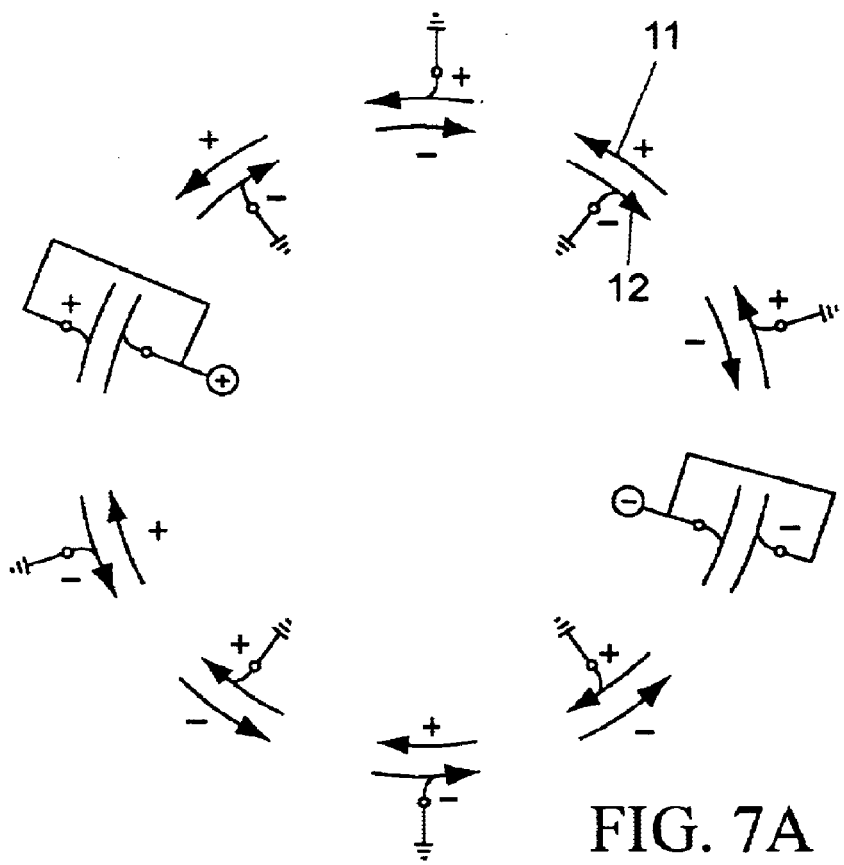
FIGS. 7A and 7B are examples of acceptable variations on the generator of FIG. 2 in which the number of charge plates 11, 12 on each disk do not produce conflicting polarities. Conflicting polarities occur whenever the number of charge plates per disk, 10, 20 are double an even number.
Figure 7B:
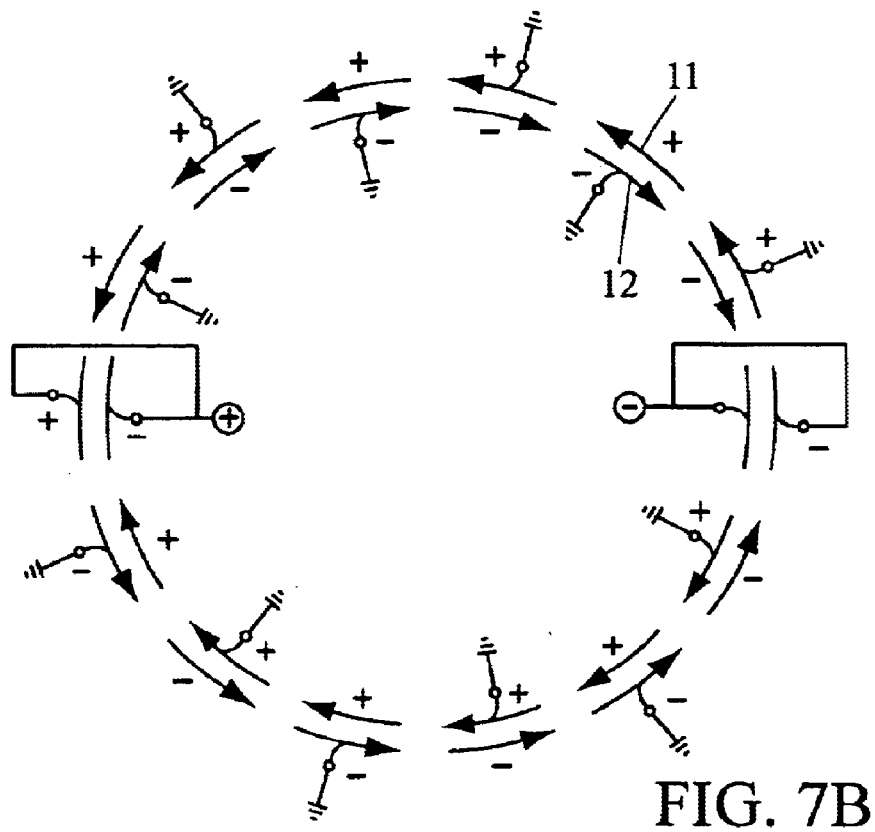

On the other hand, FIGS. 7A and B illustrates two embodiments with an acceptable number. In FIG. 7A there are 10 sets of charge plates 11, 12 on each disk, thereby yielding 10 voltage producing sectors and no conflicting polarities. Likewise, in FIG. 7B there are 14 sets of charge plates 11, 12 on each disk, thereby yielding 14 voltage producing sectors and no conflicting polarities. As a general rule, the number of charge plates/sectors should not equal the double of any even number as this will cause conflicting polarities, whereas the double of any odd number will avoid such problems and produce no conflicts.

Having now fully set forth the preferred embodiments and certain modifications of the concept underlying the present invention, various other embodiments as well as certain variations and modifications of the embodiments herein shown and described will obviously occur to those skilled in the art upon becoming familiar with the said underlying concept. It is to be understood therefore, that the invention may be practiced otherwise than as specifically claimed herein.

I claim:

1. An electrostatic generator comprising:

first and second nonconducting disks, rotatably mounted about a common principal axis, said first disk having a plurality of conducting sectors, and said second disk having an equal number of conducting sectors;

said plurality of conduction sectors numbering double an odd integer;

first and second charge collecting means, said first charge collecting means comprising a first contact with said first disk, a second contact with said second disk, and a first conductor, said second charge collecting means disposed opposite to said first charge collecting means and comprising a first contact with said first disk, a second contact with said second disk, and a second conductor;

charge balancing means comprising a first grounded brush for contacting said first disk, a second grounded brush for contacting an opposing portion of said first disk, a third grounded brush for contacting said second disk, and a fourth grounded contact for contacting an opposing portion of said second disk;

means for mechanically engaging said disks, wherein said first disk rotates about the principle axis in opposite direction to said second disk;

mechanical input means for contra-rotation of the disks;

wherein said charge balancing means further comprises a plurality of conductors each connecting a pair of contacts with said first disk, and a plurality of conductors each connecting a pair of contacts with said second disk.

* * * * *